United States Patent [19]

Hinden

[11] Patent Number: 4,855,562
[45] Date of Patent: Aug. 8, 1989

[54] WELD PIN FOR INSULATION ATTACHMENT

[76] Inventor: Milton Hinden, Rte. #110, Farmingdale, N.Y. 11735

[21] Appl. No.: 258,515

[22] Filed: Oct. 17, 1988

[51] Int. Cl.$^4$ .......................... B23K 9/20; B23K 11/14
[52] U.S. Cl. ......................................... 219/93; 219/98; 248/205.3
[58] Field of Search ............................ 219/93, 99, 98; 411/258, 171, 82, 915; 248/205.3, 547, DIG. 1

[56] References Cited

U.S. PATENT DOCUMENTS 3,300,173 5/1965 Kennedy ........................... 248/205.3
3,582,603 6/1971 Hinden ................................... 219/99

Primary Examiner—Clifford C. Shaw
Assistant Examiner—Scott A. Rogers
Attorney, Agent, or Firm—Mark T. Basseches; Paula T. Basseches

[57] ABSTRACT

A resistance weld pin for securing insulation to duct interior is disclosed. A characterizing feature resides in the provision of a layer of heat activated adhesive on the under surface of the washer of the weld pin, which adhesive is melted in the course of forming a resistance weld and bonds to the surface of the insulation, defining an annular air seal surrounding the pin.

4 Claims, 1 Drawing Sheet

WELD PIN FOR INSULATION ATTACHMENT

BACKGROUND OF THE INVENTION

1. Field of the Invention

The present invention is directed to improvements in the air conditioning field and is directed more particularly to an improved welding pin especially adapted to fasten batts of insulation to air ducts.

2. The Prior Art

As conductive to the understanding of the present invention it should be appreciated that air conduit systems in order to minimize thermal transfer typically employ batts of insulation bonded to the interior of air ducts or conduits. Bonding is typically effected by the use of adhesives. However, adhesives alone do not reliably secure the insulation over protracted periods of time due to partial or complete rupture between the adhesive bonds, with the result that insulation may sag or fall into the air stream.

In order to assure the proper positioning of insulation it is common practice, in addition to the use of adhesives, to employ metal fasteners extending through the insulation and secured to the duct interior as by resistance welding or by impact fastening.

Welded connections have been found to provide the most reliable means of supporting insulation in the desired position. Representative examples of means for effecting welded connections may be found in one or more of the following U.S. patents issued solely or jointly to me: U.S. Pat. No. 3,624,340 of Nov. 3, 1971; 3,835,285 of Sept. 10, 1974; 3,858,024 of Dec. 31, 1974; 4,438,314 of Mar. 20, 1984; 4,482,795 of Nov. 13, 1984.

A problem existing in the use of welded fasteners in conjunction with the normally low density insulation materials resides in the fact that in the course of forming a resistance weld the shank of the weld pin is heated to a high temperature, with resultant damage of the insulation materials immediately adjacent the shank.

In air conduit installations it occurs that the air enters beneath the head of the attached pin and passes into the mass of insulation with a resultant billowing of the insulation.

While typical insulation batts will include a thin polymeric or metallic foil surface layer covering the fibrous insulation, the destruction of the materials adjacent the shank, in the course of applying conventional resistance weld pins, compromises the integrity of the insulation in the area surrounding the pin, with resultant disintegration of the insulating materials

SUMMARY OF THE INVENTION

The present invention may be summarized as directed to an improved welding pin adapted to be connected by a resistance weld operation to the interior of air conduits to maintain insulating material in engagement with the conduits.

A characterizing feature of the invention resides in the provision on the under surface of the head of the resistance weld pin of a layer of heat activated adhesive In the course of weld formation the adhesive material is softened and caused to bond to the insulating material and/or to the foil or polymeric coating formed thereon, with the result that an air impervious connection is formed between the skin of the insulation and the under surface of the weld pin head, positively precluding the ingress of air into the mass or body of the insulation, notwithstanding damage to the insulation surrounding the shank.

Figure 1:
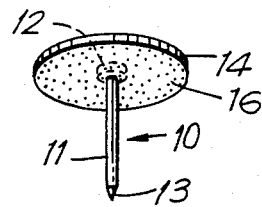
FIG. 1 is a perspective view from below of a weld pin in accordinace with the invention.

Referring now to the drawings, there is disclosed a weld pin 10 comprised of a shank 11 having a head 12 formed thereon at one end and a sharpened point 13 at the other end. An enlarged washer 14 is sleeved over the pin such that the washer lies subjacent the head 12.

As is conventional, the aperture of the washer lightly embraces the shank 11 so that there is minimal play between the washer and the pin.

A characterizing feature of the present invention resides in the provision on the under surface 15 of the washer of a layer 16 of heat activated material.

While any of a number of satisfactory heat activated adhesives may be employed, by way of example and without limitation a preferred such adhesive is supplied by Borden Chemical Corp. of Brooklyn, N.Y. under the name Coco Melt, (No. 6450).

The elected adhesive should be capable of withstanding for short durations temperatures of up to 400° F. (204° C.) or more without disintegration, and should be activated to an adhesive condition at about 250° F. (121° C.).

Figure 2:
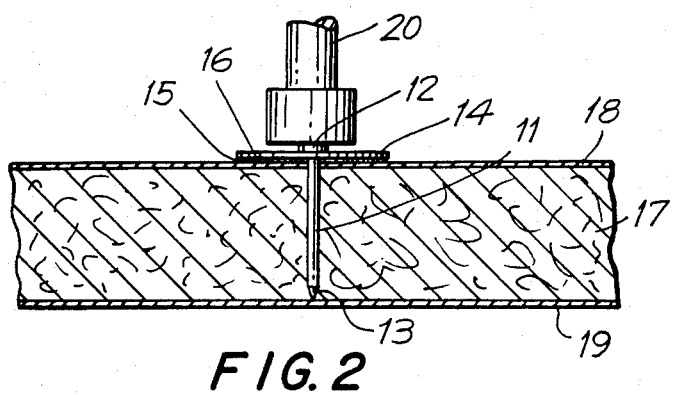
FIG. 2 is a vertical sectional view of a weld pin, welding electrode and duct in advance of application of the pin.

In FIG. 2 there is disclosed a typical arrangement wherein an insulation sheet 17 which preferably may include a metal foil or polymeric upper layer 18 is to be bonded to interior surfaces of a duct 19. Preferably the duct adjacent layer of the insulating material has been bonded to the interior surface of the duct 19 as by an adhesive layer (not shown) To assure the maintenance of the adhesive connection between duct and insulation a multiplicity of weld pins 10 are applied in spaced relation throughout the duct.

As shown in FIG. 2, application of the weld pin is effected by disposing the point 13 of the pin against the interior surface of duct 19 and pressing a weld electrode 20 against head 12.

Figure 3:
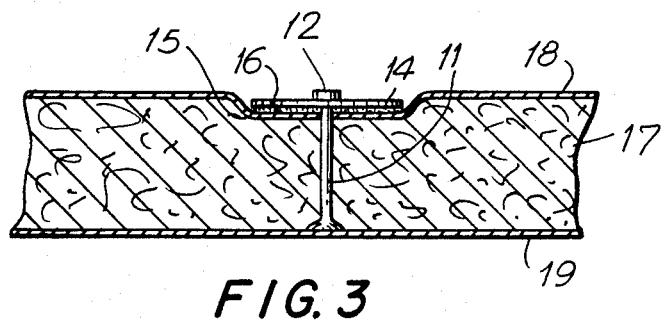
FIG. 3 is a view similar to FIG. 2 after application of the weld pin.

With the parts as shown in FIG. 2 and with the duct 19 connected to the ground electrode of the welding apparatus, current is caused to flow through electrode 20, head 12 and shank 11 to the point 13, with the result that continued downward pressure on the electrode during the brief welding cycle causes the material of the pin point to become molten and bond to the duct 19, as shown in FIG. 3.

The weld heat is also conducted upwardly through the shank 11 and functions to activate or melt the layer of adhesive 16 and bond the adhesive to the foil 18.

The heat developed in the shank may often destroy some of the insulation in the area immediately surrounding the shank. With conventional resistance weld pins it is possible that with repeated cycling of the air conditioning apparatus air may enter under the washer, agitating the partially destroyed material adjacent the shank, with ultimate compromising of the integrity of the insulation in the area surrounding the weld pin In time this condition may result in increments of the fragile insulation, typically glass wool, entering into the air stream. Such undesirable results are obviated by the instant invention due to the bond defined between the foil of the insulation and the adhesive of the under surface of the washer of the weld pin.

Specifically, due to the bond surrounding the area of insulation through which the pin projects, the ingress of air into the body of the insulation is effectively prevented, whereby the integrity of the insulation is preserved.

As will be apparent to those skilled in the art familiarized with the instant disclosure, numerous variations in details of construction may be made without departing from the spirit of the invention. Accordingly, the invention is to be broadly construed within the scope of the appended claims

Having thus described the invention and illustrated its use, what is claimed as new and is desired to be secured by Letters Patent is:

1. As a new article of manufacture, a resistance weld pin for attaching batts of insulation to a duct comprising an elongate shank having a point at one end and enlarged head means at the other end disposed generally perpendicular to the axis of said shank, the surface of said head means nearest said point having a het activated adhesive coating.

2. The article of claim 1 wherein said head means includes a washer sorrounding said shank, said coating being formed on said washer.

3. The method of attaching batts of insulation to the surface of a duct or the like by resistance welding comprising the steps of providing a resistance weld pin comprising an elogate shank having a point at one end and enlarged head means at the other end, said head means being disposed generally perpendicular to the axis of said shank, the surface of said head means nearest said point having a heat activated adhesive coating formed thereon, passing said shank through said batt of insulation until said point contacts said duct, passing a weld current through said pin while pressing said point against said duct, thereby to melt said point and attach said pin to said duct, the heat of said weld current simultaneously activating said adhesive and bonding said surface of said head means to said batt.

4. The method of claim 3 wherein said head means includes an enlarged washer surrounding said shank, said adhesive coating being formed on the surface of said washer nearest said point.

* * * * *